Feb. 13, 1934.  A. B. HASLACHER  1,947,083
CONTAINER
Filed Aug. 9, 1930

INVENTOR.
ALFRED B. HASLACHER
BY White, Prost, Fleher & Lothrop
ATTORNEYS.

Patented Feb. 13, 1934

1,947,083

UNITED STATES PATENT OFFICE 1,947,083

CONTAINER

Alfred B. Haslacher, San Francisco, Calif.

Application August 9, 1930. Serial No. 474,116

3 Claims. (Cl. 220—93)

This invention has to do with an improvement in the containers which are utilized for packing foods, such as berries, cherries, peaches and other fruits or vegetables, such as peas. The invention particularly relates to a container utilized for packaging a food in the presence of a liquor, such as a sugar solution. These liquors are usually of a higher specific gravity than the fruits or vegetables so that some of the pack float partially out of the liquor in contact with the air space in the container. Even though this air space is reduced to as small a quantity as is practical, the fruits or vegetables in contact with it become, depending upon the food, lightened or darkened in color or otherwise deteriorated compared to the food present in the container which is constantly immersed in the liquor. The change in color is undesirable as is the possibility of other deterioration of the food.

In accordance with my invention, I have devised a container in which the fruit or vegetable to be packed is placed in a liquor, but the structure of the container is such that the fruit or vegetable in the container is prevented from floating up into the air space, being constantly submerged in the liquor, so that the decolorization or darkening, or other deterioration which takes place upon contact between the fruit or vegetable and the air space cannot occur.

It is in general an object of the invention to devise a novel container structure which will hold the contents of a container in such relationship to the container air space and the liquor in the container that the undesirable deterioration occurring upon contact between the pack in the container and the air space is prevented.

Other advantages, features and objects of my invention will appear in the following specification in which I have outlined a preferred form of the container of my invention. It is to be understood that the form herein depicted exemplifies the preferred form of the invention, but that other modifications of the invention can be made within the scope of the appended claims.

In the drawing Figure 1 is a plan view of a container embodying my invention.

Figure 1:
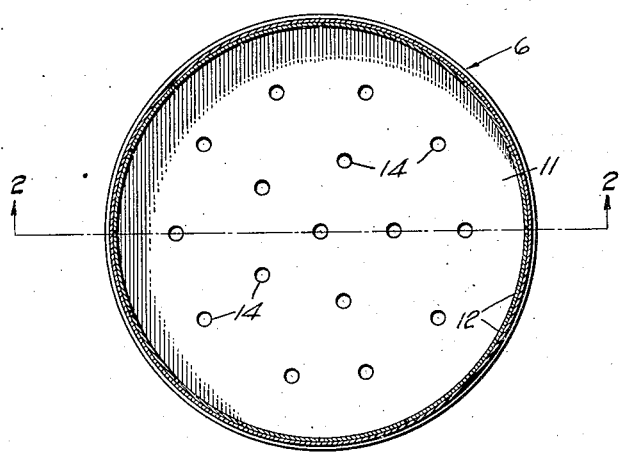
Figure 2:
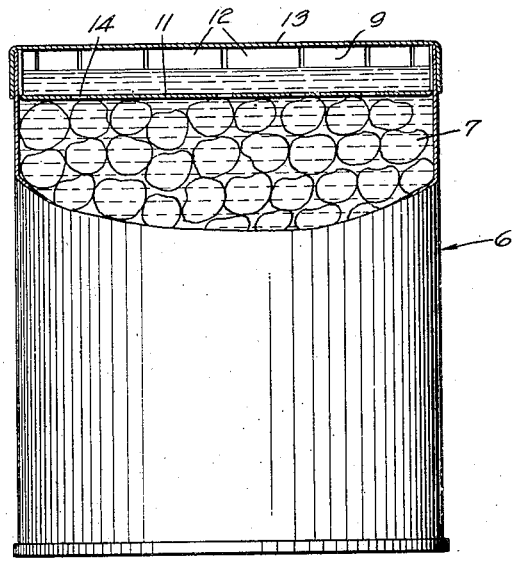
Figure 2 is a side elevation, partly in section, taken along the line 2—2 of Fig. 1.

My invention may be briefly characterized as comprising the provision of means for preventing the pack in a container from rising in the liquor in the container, so that a portion of the pack floats in the air space in the container. This invention has proven particularly successful in connection with the packing of fresh fruits and vegetables in containers in a suitable liquor in which they are preserved by freezing to a relatively low temperature as is disclosed in my Patent 1,586,898.

In the drawing I have illustrated a container 6, which is conveniently formed of a suitable material as wax paper or of the materials which comprise the present commercial tin can. The container is filled with the article to be packed such as a food, the food being generally indicated at 7. A liquor of a suitable nature in accordance with the food to be packed, such as a sugar liquor or a brine, is placed in the container and is furnished of such volume that preferably only a very slight air space 9 exists. This air space, however, is sufficient to cause the deterioration of the food products or other articles in the container and, in accordance with my invention, I provide means for ensuring that the articles packed in the liquor cannot arise and float above the liquor in contact with the air space irrespective of whether the pack is subsequently frozen or not. Thus I furnish a plate or depressor 11 which is adapted to be inserted into the container on top of the pack. This plate preferably extends entirely across the entire extent of the container so that the articles packed cannot pass. The plate is conveniently formed of the same material as the container, as of paper or tin, although other suitable materials can be successfully employed if desired.

To ensure that the articles are maintained under the liquor, a plurality of peripheral lips 12 are formed upon the plate and are adapted to be bent back upon the plate so that when the plate or depressor is placed within the container the several lips extend upwardly and engage container cover 13 when it is positioned. The length of the peripheral lips can be varied so that the quantity of food or articles packaged can be gauged by the amount which the plate can be depressed in the container. The spacing means provided by the peripheral lips can also be provided at other portions of the plate than the periphery, if it is desirable, so that the plate and the pack in the container are maintained at a substantially uniform distance from the cover of the container.

Means are also provided for permitting the free circulation of liquor past the plate so that the plate can be readily inserted in the container and so that a circulation and free flow of the liquor can take place, particularly at the center of the plate. Since the pack, when subject to a freezing action, freezes slowly toward the center and expands as it freezes, the liquor is forced up through the holes in the center of the plate. The holes also ensure that air bubbles find their way out from under the plate when it is inserted on top of the pack.

If it is desired that full protection against oxidation be secured in each container, two plates can be utilized, one at what normally constitutes the bottom of the container and another at the top so that irrespective of the position of the container, that is, whether it is on its top or on its bottom, the pack is maintained out of contact with the air space and is always submerged in the liquor if the container is utilized for an unfrozen pack.

Figure 3:
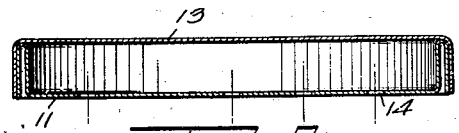
Figure 3 is a sectional side elevational view through a container cover embodying features of my invention.

In Fig. 3 I have shown a structure in which the plate 11 is provided integrally with the paper cover 13 so that the placing of the cover automatically insures that the pack in the container is maintained below the level of the liquor at all times. This structure has certain advantages, particularly where articles are being removed from the liquor in the container at intervals.

I claim:

1. The combination with a cylindrical container of a perforated plate axially movable in said container and having an upturned edge forming a substantially continuous flange frictionally engaging the wall of said cylindrical container to hold said plate in any axial position, and a separate cover engaging one end of said container and limiting the axial movement of said plate in one direction.

2. The combination with a cylindrical, open ended container of a perforated plate axially movable in said container and having a plurality of peripheral upturned projections providing a substantially continuous cylindrical flange adapted frictionally to engage the wall of said cylindrical container and a separate cover adapted to span the open end of said container and engage the wall thereof to limit the axial movement of said plate in one direction.

3. As an article of manufacture for use with a cylindrical container, a substantially circular perforated planar sheet of waterproofed paper having radial notches in its periphery defining lips adapted to be bent with respect to the sheet to form a substantially continuous cylindrical flange for frictional engagement with the wall of said container.

ALFRED B. HASLACHER.